April 26, 1938. W. G. FINDLEY 2,115,489
SLED
Filed Aug. 19, 1936
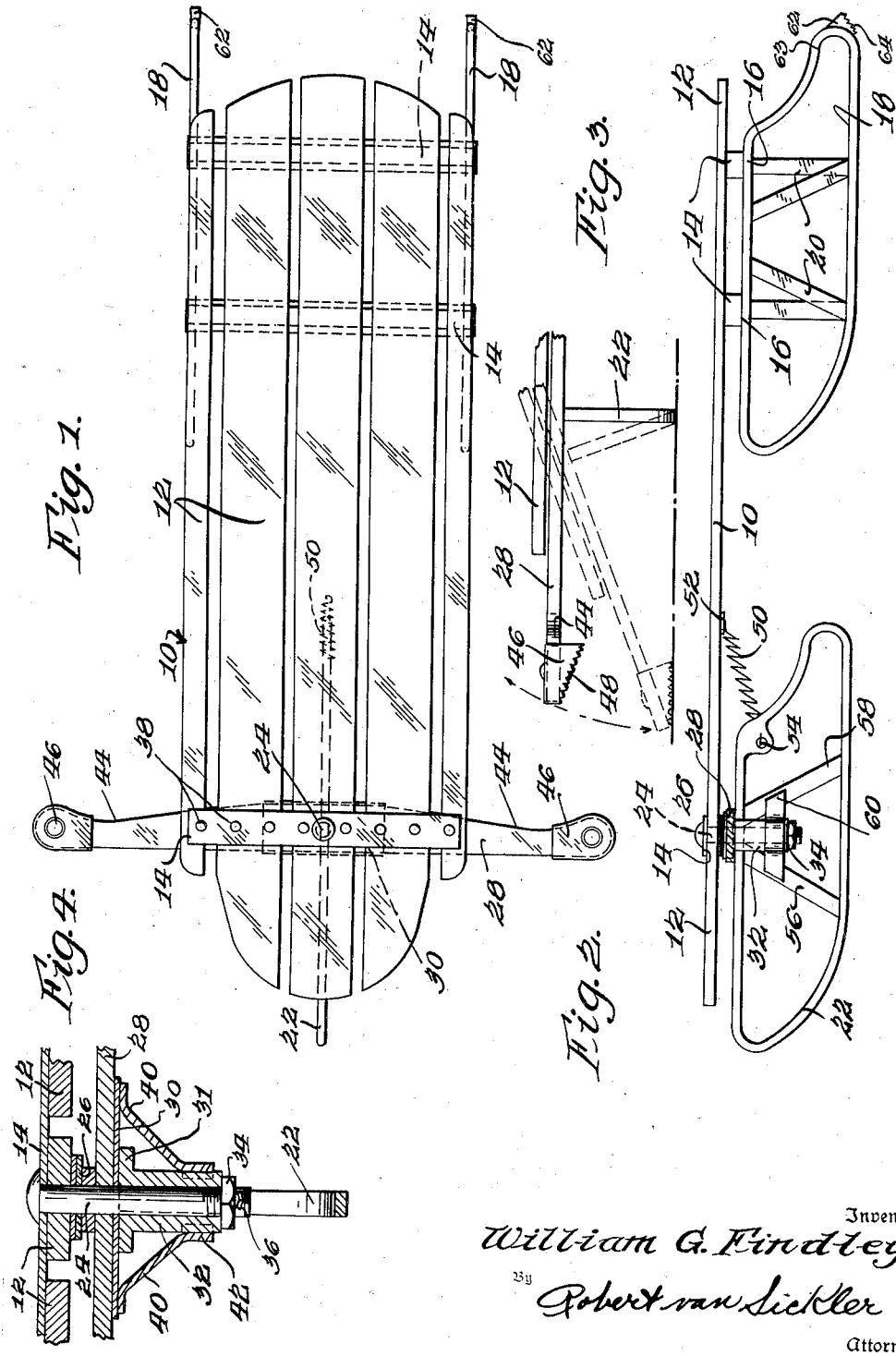

Patented Apr. 26, 1938

2,115,489

UNITED STATES PATENT OFFICE 2,115,489

SLED

William G. Findley, Columbia, Pa.

Application August 19, 1936, Serial No. 96,893

3 Claims. (Cl. 280—21)

This invention relates to coasters and particularly to those having rear sleds or runners and a single runner in front and centrally disposed, this front runner being pivotally mounted to the frame and having a steering rod or bar secured thereto.

It has been found that the common type of sleds are very dangerous to operate, particularly in cities where the traffic is heavy. This is due mainly because the prevalent steering arrangement does not permit easy and efficient turning and most of the sleds are not equipped with any means for stopping the sled in emergencies. It is also true of the few that do have some braking mechanism, that it becomes necessary to remove one of the hands to operate the brake.

It is an object then to provide a sled, so designed, as to permit of easy turning.

Another object is to provide means for efficiently mounting the front runner to the frame so as to have the steering rod disposed therebelow.

A further object is to provide means for stopping the sled in an emergency, including means for gripping into the snow or ice to insure control of the forward movement of the sled.

A still further object of my invention is to provide a braking mechanism which may be operated without removing either of the two hands of the steerer from the rod.

An additional object is to provide means for retaining the front runner in parallel relationship with the main sled portion under non-turning conditions.

With these and various other objects in view, the invention may consist of certain novel features of construction and operation as will be more fully described and particularly pointed out in the specification, drawing and claims appended hereto.

In the drawing, which illustrates an embodiment of the device, and wherein like reference characters are used to designate like parts,—

Figure 1 is a top plan view of my invention.

Figure 2 is a side elevation of the same.

Figure 3 is a fragmentary diagrammatic view, the tilting position being shown in dotted lines, while, Figure 4 is a sectional view showing the manner of securing the front runner to the frame.

The coaster comprises a frame or platform 10 and includes members 12 secured together by cross pieces 14, in any well known manner. To the rear of the coaster and integrally secured to the cross pieces 14, as at 16, are rear runners 18. These runners are suitably braced at 20.

The front central runner 22 is secured to the frame in the following manner. A bolt 24 is inserted in the apertures in the cross piece 14, the central member 12, washers and spacers 26, the steering rod 28, bracing member 30, and sleeve 32. The bolt 24 is threaded at its lower end to receive the nut 34 and provided with a cotter pin 36 to prevent accidental removal. The sleeve 32, in Fig. 4, is provided with an increased portion 31 and is spot welded at this point to the bracing member 30 while the bracing member in turn is secured to the steering rod as at 38. The front runner 22 and steering rod are secured together and braced by means of the two side braces 40 which are also spot welded to the bracing member 30. The lower portions of these braces are provided with increased semi-circular portion 42 which is adapted to engage the lower portion of said sleeve 32 and be secured thereto as by spot welding.

The steering rod 28 is provided with handle portions 44 while at the ends thereof are secured surface engaging members 46. These members are secured as by bolts, rivets or other known means. The lower surface of the members 46 are tapered at 48 and are roughened or grooved to permit this surface to bite into the snow or ice to insure the retardation of the sled when these surfaces come into contact with the road or street by tilting the sled. As shown in Fig. 3, this surface, when the sled is tilted, lies in the same plane as the roadway thus always insuring perfect contact therewith.

As shown in Fig. 2, a spring 50 is secured to the central member 12 and to the rear end of the front runner 22 as at 52 and 54 so as to retain the front runner in parallel position to the sled when no turning action is imparted to the steering rod.

In the modification of the sleeve retaining means shown in Fig. 2, I have provided braces 56 and 58 secured as by spot welding to the top and bottom of the runner 22. The sleeve 32 is supported at its lower end by two side members 60, also spot welded to the braces 56 and 58 and adapted to encircle the sleeve 32 and integrally secured thereto.

I have also provided brake shoes 62 with roughened surfaces 64 similar to shoes 46 on the rear end 63 of the rear runners. The shoes 62 are integrally secured in any well known manner a sufficient distance from the bottom to prevent contact with the ground under normal condition. When it becomes necessary to stop the movement of the sled, the rider may, by lifting the front end of the sled off the ground, bring the surfaces 64 into contact with the ground.

Operation

When the sled is in motion and an occasion arises to stop the movement of the sled, the rider shifts his weight to one side or the other causing the sled to tilt, as indicated by the arrows in Fig. 3. This movement allows the end of the steering rod on the lower side to engage the ground and because of the biting or gripping means provided on this steering rod end, impart to the sled a rotary or swirling motion, thus preventing forward motion of the sled.

It is to be understood that I do not wish to be limited to the exact embodiment of the device shown, which is merely by way of illustration and not limitation, as various and other forms of the device will of course be apparent to those skilled in the art without departing from the spirit of the invention or the scope of the claims.

What I claim as my invention is:

1. In a sled, a platform, a front and two rear runners, a vertical shaft journaled in a bearing mounted in said front runner and means for bracing said bearing, including two vertical members secured to the top and bottom of said front runner, two side members secured to both of said vertical members and adapted to encircle and secure said bearing against movement; a steering rod disposed below said platform and above said front runner and adapted to have cooperative engagement with said front runner.

2. In a sled, a platform, a front and two rear runners, a vertical shaft journaled in a bearing mounted in said front runner and means for bracing said bearing, including two vertical members secured to the top and bottom of said front runner, two side members secured to both of said vertical members and adapted to encircle and secure said bearing against movement, said front runner disposed in front of said rear runners, a steering rod disposed below said platform and above said front runner and adapted to have cooperative engagement with said front runner.

3. In a sled, a platform, a front and two rear runners, said platform extending up to the forward end of said front runner and back to the rearward end of said rear runners, said front runner spaced lengthwise from the two rear runners, a vertical shaft journaled in a bearing mounted in said front runner and means for bracing said bearing, including two vertical members secured to the top and bottom of said front runner, two side members secured to both of said vertical members and adapted to encircle and secure said bearing against movement, said front runner disposed in front of said rear runners, a steering rod disposed below said platform and above said front runner and adapted to have cooperative engagement with said front runner.

WILLIAM G. FINDLEY.